(12) United States Patent
Shakal

(10) Patent No.: US 9,803,631 B2
(45) Date of Patent: Oct. 31, 2017

(54) BOX LUBRICATION PUMP

(71) Applicant: Graco Minnesota Inc., Minneapolis, MN (US)

(72) Inventor: Anthony J. Shakal, Rogers, MN (US)

(73) Assignee: Graco Minnesota, Inc., Minneapolis, MN (US)

( * ) Notice: Subject to any disclaimer, the term of this patent is extended or adjusted under 35 U.S.C. 154(b) by 534 days.

(21) Appl. No.: 14/343,954

(22) PCT Filed: Nov. 21, 2012

(86) PCT No.: PCT/US2012/066377
§ 371 (c)(1),
(2) Date: Mar. 10, 2014

(87) PCT Pub. No.: WO2013/078398
PCT Pub. Date: May 30, 2013

(65) Prior Publication Data
US 2014/0255226 A1    Sep. 11, 2014

Related U.S. Application Data

(60) Provisional application No. 61/562,811, filed on Nov. 22, 2011.

(51) Int. Cl.
F04B 39/10 (2006.01)
F16N 13/14 (2006.01)
(Continued)

(52) U.S. Cl.
CPC ............ F04B 39/10 (2013.01); F04B 1/0408 (2013.01); F04B 1/0443 (2013.01);
(Continued)

(58) Field of Classification Search
CPC ...... F04B 1/408; F04B 1/0443; F04B 1/0448; F04B 39/10; F04B 53/164; F04B 53/18; F04B 53/02; F16N 13/14; F02M 57/02
(Continued)

(56) References Cited

U.S. PATENT DOCUMENTS 1,976,493 A    10/1934  Griffith et al.
3,187,673 A     6/1965  Kramer et al.
(Continued)

FOREIGN PATENT DOCUMENTS

GB    2348931 A    10/2000
JP    59185812 A   10/1984
(Continued)

OTHER PUBLICATIONS

Partial Supplementary European Search Report, EP Application No. 12852363.6, dated Feb. 2, 2016, 8 pages.
(Continued)

*Primary Examiner* — Devon Kramer
*Assistant Examiner* — Connor Tremarche
(74) *Attorney, Agent, or Firm* — Kinney & Lange, P.A.

(57) ABSTRACT

A box lubricator that includes a pump with a piston housing and piston. The piston housing extends from a first end to a second end, and includes a bore extending through the piston housing from the first end of the piston housing to the second end of the piston housing. The piston housing also includes a recess disposed at the second end of the piston housing, the recess being concentric with the bore and comprising a diameter larger than a diameter of the bore. The piston is disposed inside the bore of the piston housing. At least one elastomeric seal is disposed inside the recess of the piston housing and around the piston. In some embodiments, a ball and socket joint connects the piston to the rocker arm
(Continued)

assembly. In some embodiments, a fluid passage and a check valve are disposed inside the piston.

4 Claims, 10 Drawing Sheets

(51) Int. Cl.
  *F04B 1/04* (2006.01)
  *F04B 53/02* (2006.01)
  *F04B 53/16* (2006.01)
  *F04B 53/18* (2006.01)
(52) U.S. Cl.
  CPC ............ *F04B 1/0448* (2013.01); *F04B 53/02* (2013.01); *F04B 53/164* (2013.01); *F04B 53/18* (2013.01); *F16N 13/14* (2013.01)
(58) Field of Classification Search
  USPC .......................................... 417/554; 123/500
  See application file for complete search history.

(56) References Cited

U.S. PATENT DOCUMENTS

| | | | | |
|---|---|---|---|---|
| 4,099,597 | A | | 7/1978 | Powell et al. |
| 4,241,706 | A | * | 12/1980 | Shimada .................. F01L 1/32 123/90.3 |
| 4,966,108 | A | * | 10/1990 | Bentz ....................... F01L 1/146 123/508 |
| 5,662,023 | A | * | 9/1997 | Carson .................... F16N 13/04 184/7.4 |
| 6,321,723 | B1 | * | 11/2001 | Merkle .................. F02M 57/02 123/500 |
| 6,457,956 | B1 | | 10/2002 | Hauser et al. |
| 6,557,507 | B2 | * | 5/2003 | Rosenbush ............... F01L 1/18 123/90.39 |
| 2004/0219030 | A1 | | 11/2004 | Cooper et al. |

FOREIGN PATENT DOCUMENTS

| | | |
|---|---|---|
| JP | 59190417 A | 10/1984 |
| WO | WO2006031935 A1 | 3/2006 |
| WO | 2010085489 A1 | 7/2010 |

OTHER PUBLICATIONS

Extended European Search Report, for European Patent No. 12852363.6, dated May 9, 2016, 14 pages.

Taiwanese Office Action, for Taiwan Patent Application No. 101143794, dated Jun. 23, 2016, 15 pages.

\* cited by examiner

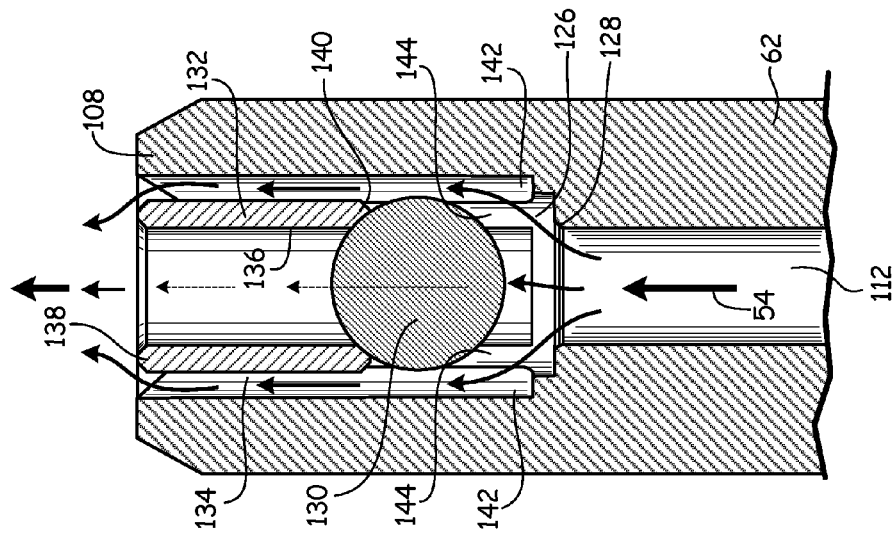
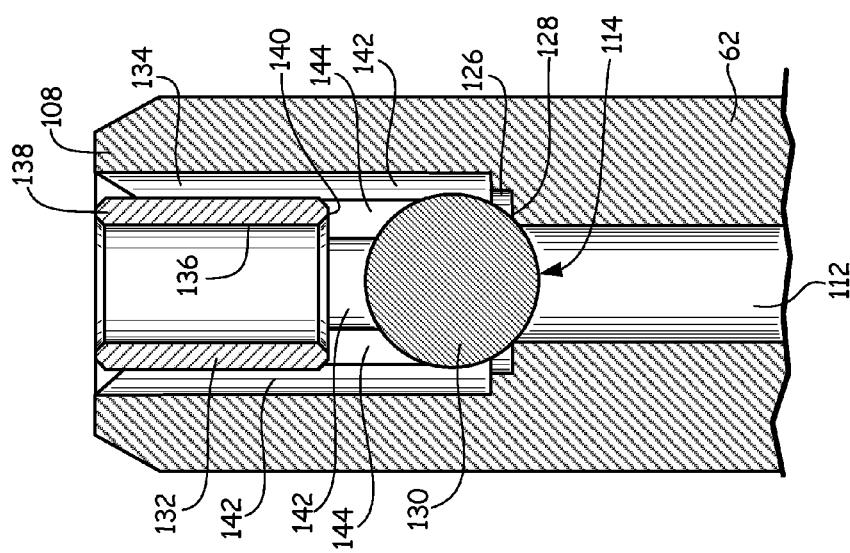

BOX LUBRICATION PUMP

BACKGROUND

Box lubrication pumps are modular pumps that provide pump-to-point lubrication, allowing consumers to adapt a lubrication system to an already existing system or machine without replacing or overhauling the system or machine. Box lubrication pumps are commonly used in manufacturing, refining, and gas transmission applications to lubricate piston assemblies and high speed bearings. They are also used in the lumber industry to lubricate and cool blades, guides, edgers, planers, and band saws. They have also been used in the rubber industry to lubricate dust stop seals on mixers. Box lubrication pumps are cost-effective and robust due to their simple, self-lubricating design.

In the prior art, box lubrication pumps are available in three different configurations: pressure fed, gravity fed, and suction fed. Each configuration includes as many as one to twenty four individual pumps mounted to a reservoir box, each pump having a rocker arm assembly located inside of the reservoir box. A motor-driven camshaft assembly located inside of the reservoir box actuates the rocker arm assembly, which in turn actuates a piston inside of each pump. The camshaft assembly, the rocker arm assembly, and the interface between the rocker arm assembly and piston are submerged in and lubricated by fluid housed inside the reservoir box. As the piston inside each pump is actuated by the rocker arm assembly, the piston pushes the fluid through a discharge outlet of each pump. In pressure fed configured pumps, fluid is pressure fed to the piston through an inlet line connected to a second reservoir separate from the reservoir box to which each pump is mounted. In gravity fed configured pumps, fluid is gravity fed to the piston through an inlet line connected to a second reservoir located above the pumps and separate from the reservoir box to which each pump is mounted. In a suction fed configured pump, the piston of each pump draws fluid from the reservoir box to which the pumps are mounted through a suction tube which extends from each pump into the reservoir box and into the fluid housed inside the reservoir box. In summary, gravity fed configured or a pressure fed configured pumps are attached to a reservoir box that lubricates their respective rocker arm assemblies yet they pump fluid that is located in a second and separate reservoir, while suction fed configured pumps pump fluid from the same reservoir that lubricates their rocker arm assemblies.

While the rocker arm assemblies of each pump configuration are lubricated by the fluid inside of the reservoir box, the pistons in each pump configuration are lubricated by the fluid that the pistons pump. In the suction fed configured pumps, the pistons are lubricated by fluid housed inside the reservoir box as they pump the same fluid out of the reservoir box. In pressure fed configured or gravity fed configured pumps, the pistons are lubricated by the same fluid that they pump out of the second reservoir. In all three pump configurations, the fluid lubricating the pistons leaks off the pistons and drains into the reservoir box. Because the fluid lubricating the pistons leaks into the reservoir box, the fluid inside the reservoir box must be the same kind of fluid as the fluid pumped by the pistons. Thus, in the case of the pressure fed configured or gravity fed configured pumps, the second reservoir must house the same kind of lubricating fluid as the reservoir box to which the pumps are mounted.

Because prior art box lubrication pumps must house the same kind of fluid inside their reservoir boxes that they pump, the fluid selected and housed is the fluid with the properties that meets the lubrication needs of the end activity to which the fluid is pumped by the box lubrication pumps. In many cases, the lubricating needs required by the end activity are different from the lubrication needs of the box lubrication pumps themselves, yet the box lubrication pumps must make due self-lubricating themselves with the fluid needed by the end activity, even when that fluid is less-than-ideal for the lubrication needs of the box lubrication pumps. Because the box lubrication pumps in these cases are self-lubricating with less-than-ideal fluid, they experience reduced performance, increased wear, and reduced life.

SUMMARY

According to the present invention, a box lubricator that includes a pump with a piston housing and piston. The piston housing extends from a first end to a second end, and includes a bore extending through the piston housing from the first end of the piston housing to the second end of the piston housing. The piston housing also includes a recess disposed at the second end of the piston housing, the recess being concentric with the bore and comprising a diameter larger than a diameter of the bore. The piston is disposed inside the bore of the piston housing. At least one elastomeric seal may be disposed inside the recess of the piston housing and around the piston.

In another embodiment of the present invention, a piston assembly includes a piston housing with a first end opposite a second end, a bore extending completely through the piston housing from the first end to the second end of the piston housing, and a piston housing inlet intersecting the bore between the first end and the second end of the piston housing. The piston housing also includes an outlet disposed at the second end of the piston housing and in fluid communication with the bore. A piston is disposed inside the bore of the piston housing and has a first end opposite a second end. The piston also has a fluid passage formed inside the piston that fluidly connects the piston housing inlet with the piston housing outlet. A first recess is formed inside the first end of the piston and is in fluid communication with the fluid passage. The first recess has a diameter smaller than a diameter of the piston yet larger than a diameter of the fluid passage. A check ball and a retaining guide are disposed inside the first recess. The retaining guide limits displacement of the check ball to the first recess.

In another embodiment of the present invention, a pump includes a support post with a first end opposite a second end, and a piston housing that also includes a first end to a second end. The piston housing also includes a bore extending through the piston housing from the first end to the second end of the piston housing. A piston is disposed inside the bore of the piston housing and includes a first end opposite a second end. The pump also includes a rocker arm assembly extending from the second end of the support post to the second end of the piston. The rocker arm assembly is pivotally connected to the second end of the support post and is also connected to the second end of the piston by a ball and socket joint.

BRIEF DESCRIPTION OF THE DRAWINGS

FIG. 6A is an enlarged cross sectional view of a first end of the piston of FIG. 5 with a check valve in a closed position.

FIG. 6B is another enlarged cross sectional view of the first end of the piston of FIG. 5 with a check valve in an open position.

DETAILED DESCRIPTION

Figure 1:
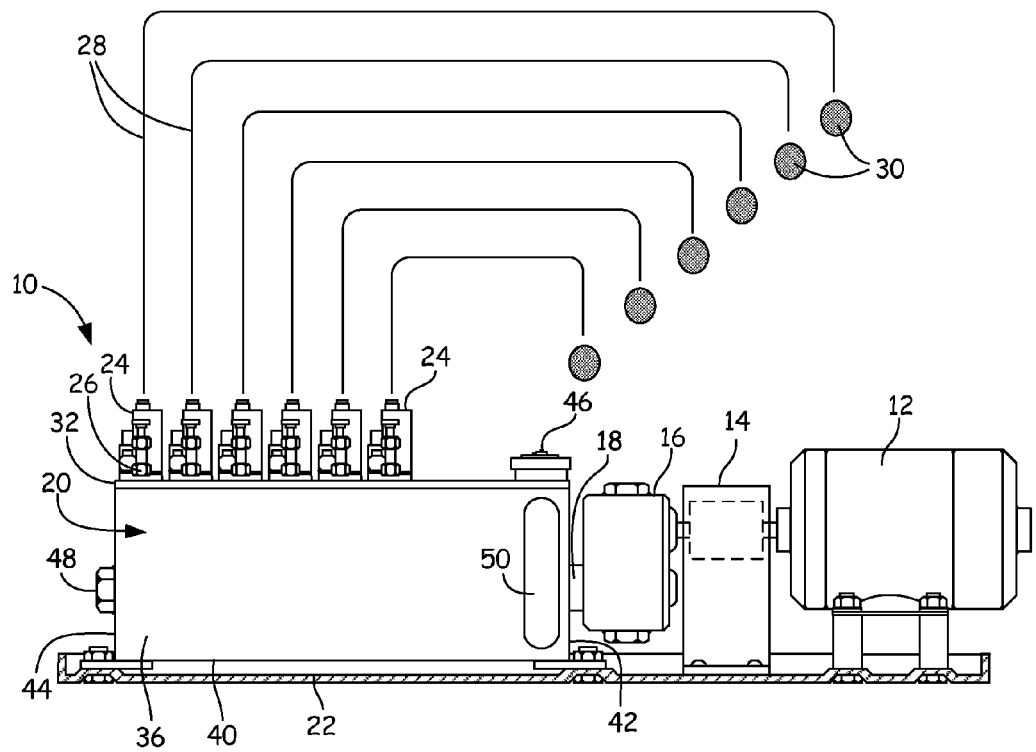
FIG. 1 is a side view of a motor and a box lubrication pump with multiple pumps.
Figure 2:
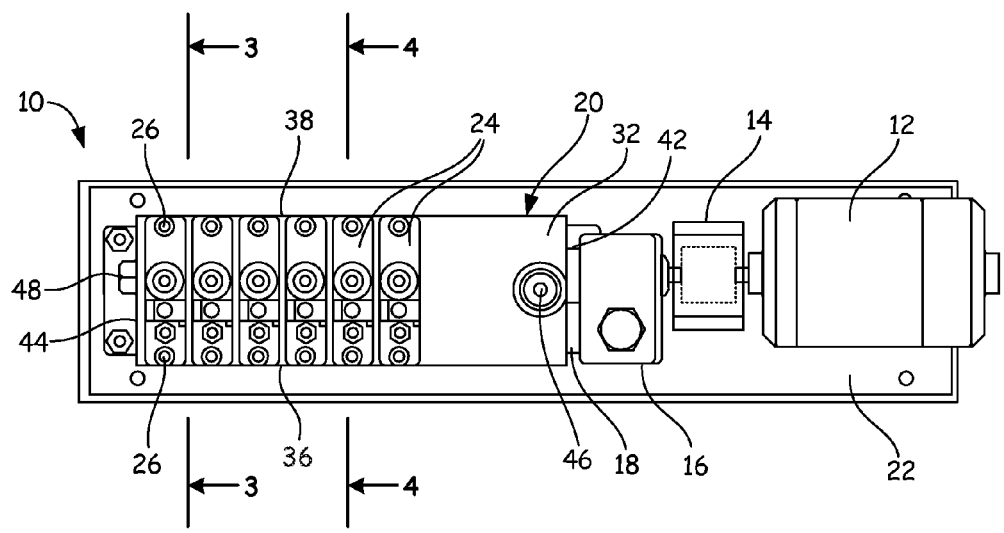
FIG. 2 is a top view of the motor and box lubrication pump with multiple pumps of FIG. 1.

FIG. 1 is a front view of box lubricator 10 and FIG. 2 is a top view of box lubricator 10. Box lubricator 10 includes motor 12, torque transmitter 14, gear reducer 16, camshaft 18, fluid reservoir 20, mounting base 22, pumps 24, bolts 26, lubrication lines 28, and lubrication points 30. In the embodiment of FIGS. 1 and 2, fluid reservoir 20 includes top plate 32, openings 34 (shown in FIGS. 3 and 4) formed in top plate 32, first sidewall 36, second sidewall 38, bottom surface 40, first endwall 42, second endwall 44, cap 46, drain plug 48, and sight gauge 50.

Fluid reservoir 20 bottom surface 40 is joined to first sidewall 36, second sidewall 38, first endwall 42, second endwall 44 in an open box geometry such that first sidewall 36 is parallel to second sidewall 38 and first endwall 42 is parallel to second endwall 44. Fluid reservoir 20 top plate 32 is joined to first sidewall 36, second sidewall 38, first endwall 42, and second endwall 44 opposite bottom surface 40 to form fluid reservoir 20 in a closed box geometry. Top plate 40 of fluid reservoir 20 includes cap 46 which can be removed to fill fluid reservoir 20 with fluid and replaced once fluid reservoir 20 carries the desired amount of fluid. Sight gauge 50 is disposed on first sidewall 36 and permits visual inspection of the level of fluid inside fluid reservoir 20. Drain plug 48 may be connected to first sidewall 36, second sidewall 38, bottom surface 40, first endwall 42, or second endwall 44 of fluid reservoir 20. In the embodiment of FIGS. 1 and 2, drain plug 48 is connected to second endwall 44. Fluid inside of fluid reservoir 20 can be drained from fluid reservoir 20 by removing drain plug 48 from second endwall 44.

Openings 34 (shown in FIGS. 3 and 4) are formed in top plate 32 of fluid reservoir 20 and sized to receive pumps 24 and permit pumps 24 to extend into fluid reservoir 20. Pumps 24 are mounted to top plate 32 of fluid reservoir 20 by bolts 26. In the embodiment of FIGS. 1 and 2, six openings 34 are formed into top plate 32 and six pumps 24 are mounted to top plate 32 of fluid reservoir 20. Though the embodiments of FIGS. 1 and 2 show six pumps 24, it will be appreciated by one skilled in the art that top plate 32 may include less than six openings 34 or more than six openings 34, and that less than six pumps 24 or more than six pumps 24 may be mounted to top plate 32 of fluid reservoir 20. Camshaft 18 enters into fluid reservoir 20 through first endwall 42 and extends horizontally into fluid reservoir 20 towards second endwall 44. Gear reducer 16 is connected to camshaft 18 outside of fluid reservoir 20. Torque transmitter 14 is connected to motor 12 and gear reducer 16 and transmits torque from motor 12 to gear reducer 16. Gear reducer 16 transmits torque to camshaft 18 and adjusts the rotational speed of camshaft 18. Motor 12 and fluid reservoir 20 are mounted inline onto mounting base 22. Torque transmitter 14 and gear reducer 16 may also be mounted onto mounting base 22 inline with motor 12 and fluid reservoir 20.

As described below in the description of FIGS. 3, 4, 9 and 10, camshaft 18 contacts pumps 24 inside fluid reservoir 20 and rotation of camshaft 18 by motor 12 actuates pumps 24. Lubrication lines 28 fluidly connect pumps 24 to lubrication points 30 such that pumps 24, when actuated by motor 12 and camshaft 18, may deliver fluid to lubrication points 30 through lubrication lines 28. Each pump 24 is individually connected to one lubrication line 28, and each lubrication line 28 is connected to one or more lubrication points 30. Pumps 24 may pump fluid from inside reservoir 20 to lubrication points 30, or pumps 24 may pump fluid from a different reservoir than the fluid reservoir 20 to lubrication points 30. The fluid in the different reservoir may be different in composition from the fluid inside fluid reservoir 20.

Figure 3:
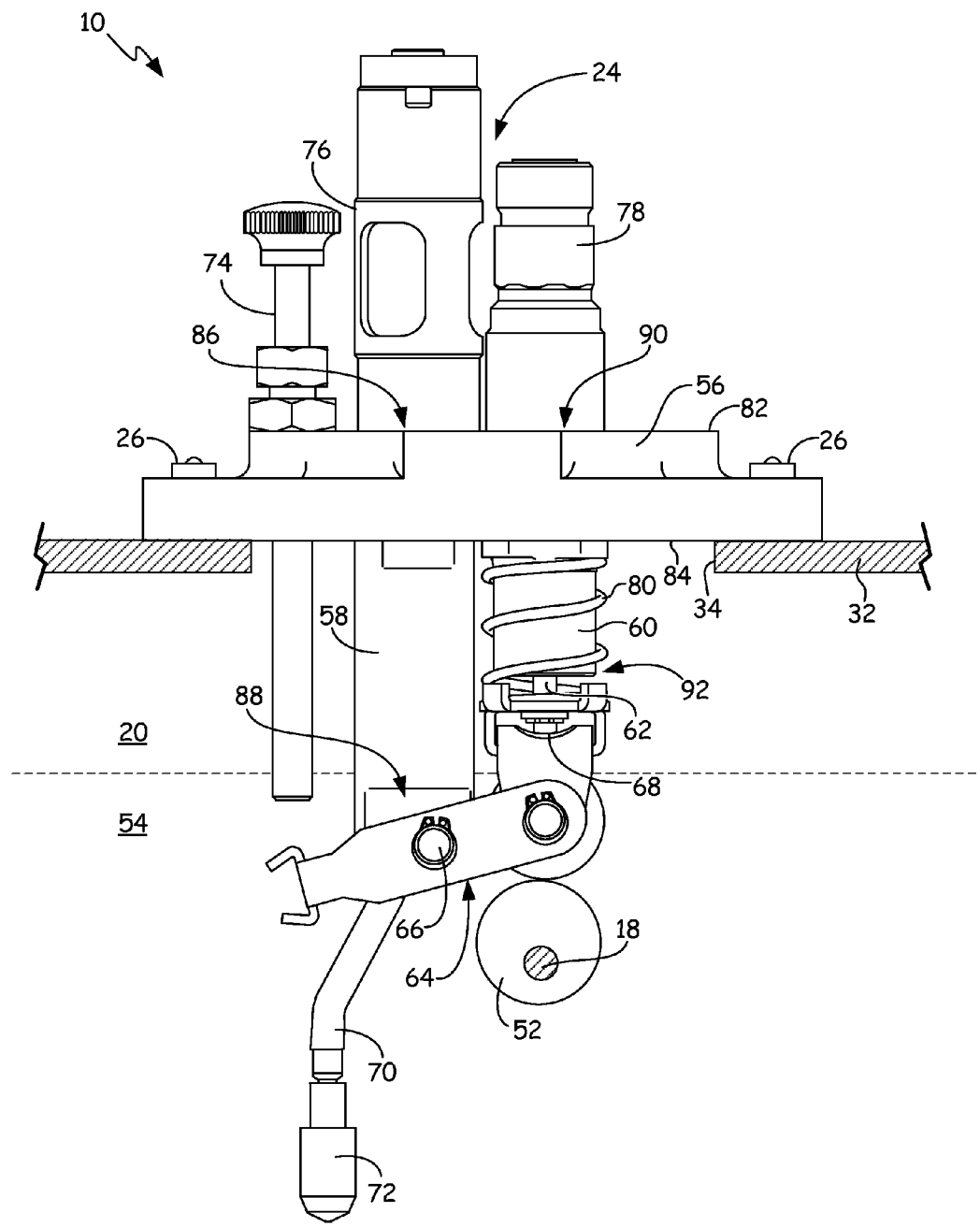
FIG. 3 is a side view of one of the pumps from the box lubrication pump of FIG. 1.

FIG. 3 is an enlarged cross sectional view of box lubricator 10 taken along line 3-3 and showing a side view of one of pumps 24. Box lubricator 10 includes camshaft 18, fluid reservoir 20, pump 24, and bolts 26. In the embodiment of FIG. 3, camshaft 18 includes cam 52. In the embodiment of FIG. 3, fluid reservoir 20 includes top plate 32, opening 34 and fluid 54. In the embodiment of FIG. 3, pump 24 includes main body 56, support post 58, piston housing 60, piston 62, rocker arm assembly 64, pivot joint 66, ball and socket joint 68, pump inlet tube 70, pump inlet strainer 72, adjustment screw 74, sight well 76, pump outlet assembly 78, and spring 80. In the embodiment of FIG. 3, main body 56 includes first surface 82 opposite second surface 84. In the embodiment of FIG. 3, support post 58 includes support post first end 86 and support post second end 88. In the embodiment of FIG. 3, piston housing 60 includes piston housing first end 90 and piston housing second end 92.

Fluid reservoir 20 comprises a box geometry that is closed by top plate 32. Fluid 54 is disposed inside fluid reservoir 20. Opening 34 is formed in top plate 32 of fluid reservoir 20 and sized to receive pump 24 and permit pump 24 to extend into fluid reservoir 20. Pump 24 is mounted to top plate 32 of fluid reservoir 20 by bolts 26. Camshaft 18 extends horizontally into fluid reservoir 20. Cam 52 is disposed on camshaft 18 inside fluid reservoir 20 and adjacent pump 24. When pump 24 is mounted onto top plate 32, second surface 84 of main body 56 of pump 24 is next to top plate 32 and covers opening 34 of top plate 32 of fluid reservoir 20. Main body 56 of pump 24 extends outside of fluid reservoir 20 from second surface 84 to first surface 82. Main body 56 may be a bracket. Bolts 26 extend through first surface 82 and second surface 84 of main body 56 and through top plate 32 of fluid reservoir 20 and anchor main body 56 of pump 24 to top plate 32 of fluid reservoir 20. In the embodiment of FIG. 3, there are two bolts 26 anchoring main body 56 of pump 24 to top plate 32 of fluid reservoir 20. Support post 58 extends from second surface 84 of main body 56, through opening 34 formed in top plate 32 of fluid reservoir 20, to support post second end 88 inside fluid reservoir 20. Support post 58 also extends outside of fluid reservoir 20, past first surface 82 of main body 56, to support post first end 86. Support post 58 may be integral with main body 56 or support post 58 may be manufactured separate from main body 56 and subsequently connected to main body 56. Support post 58 may be cylindrical.

Piston housing 60 is in close proximity to support post 58 and extends from second surface 84 of main body 56, through opening 34 formed in top plate 32 of fluid reservoir 20, to piston housing second end 92 inside fluid reservoir 20. Piston housing second end 92 is disposed inside fluid reservoir 20 directly above camshaft 18 and cam 52. Piston housing 60 also extends outside of fluid reservoir 20, past first surface 82 of main body 56, to piston housing first end 90. Piston housing 60 may be integral with main body 56 or piston housing 60 may be manufactured separate from main body 56 and subsequently connected to main body 56. Piston housing 60 may be cylindrical. Adjustment screw 74 extends through first surface 82 and second surface 84 of main body 56, through opening 34 of top plate 32 of fluid reservoir 20, and into fluid reservoir 20. Adjustment screw 74 is in close proximity to support post 58 opposite piston housing 60.

Piston 62 is disposed inside piston housing 60 and partially extends from piston housing second end 92 into fluid reservoir 20. Pivot joint 66 connects rocker arm assembly 64 to support post second end 88. Rocker arm assembly 64 extends from pivot joint 66 and support post second end 88 towards piston housing 60 and extends between piston housing second end 92 and cam 52 of camshaft 18. Rocker arm assembly 64 also extends from pivot joint 66 and support post second end 88 towards adjustment screw 74. The distance between second surface 84 of main body 56 and piston housing second end 92 is generally shorter than the distance between second surface 84 of main body 56 and support post second end 88, thereby allowing rocker arm assembly 64 the ability to rotate on pivot joint 66 and support post second end 88. Support post second end 88 also extends into fluid reservoir 20 further than adjustment screw 74 so that rocker arm assembly 64 is capable of rotating on pivot joint 66 and support post second end 88. Ball and socket joint 68 connects piston 62 to rocker arm assembly 64 between piston housing second end 92 and cam 52. Spring 80 is disposed around piston housing 60 and extends between second surface 84 of main body 56 and rocker arm assembly 64. When cam shaft 18 is rotated, cam 52 and spring 80 move piston 62 between a down stroke position and an up stroke position. Adjustment screw 74 regulates the distance in which spring 80 may push piston 62 down towards cam 52 by limiting the distance rocker arm assembly 64 may rotate on support post second end 88.

Pump inlet tube 70 is connected to support post second end 88 and extends away from support post second end 88 further into fluid reservoir 20. Pump inlet strainer 72 is connected to pump inlet tube 70 opposite support post second end 88 and strains fluid 54 that enters pump 24. Fluid 54 is disposed inside fluid reservoir 20 and typically maintained at a level sufficient to submerge pump inlet strainer 72, most of pump inlet tube 70, camshaft 18, cam 52, and rocker arm assembly 64. As described below in FIG. 4, pump inlet tube 70 fluidly communicates with piston housing 60 and piston 62 through support post 58 thereby providing fluid 54 a path to travel from fluid reservoir 20 to piston housing 60. Sight well 76 is connected to support post first end 86 and permits visual inspection of fluid 54 traveling through support post 58 to piston housing 60. Pump outlet assembly 78 is connected to piston housing first end 90. In the embodiment of FIG. 3, piston 62 pumps fluid 54 from fluid reservoir 20, through pump inlet strainer 72, pump inlet tube 70, support post 58, and piston housing 60, and into pump outlet assembly 78. Pump outlet assembly directs fluid 54 away from pump 24.

Figure 4:
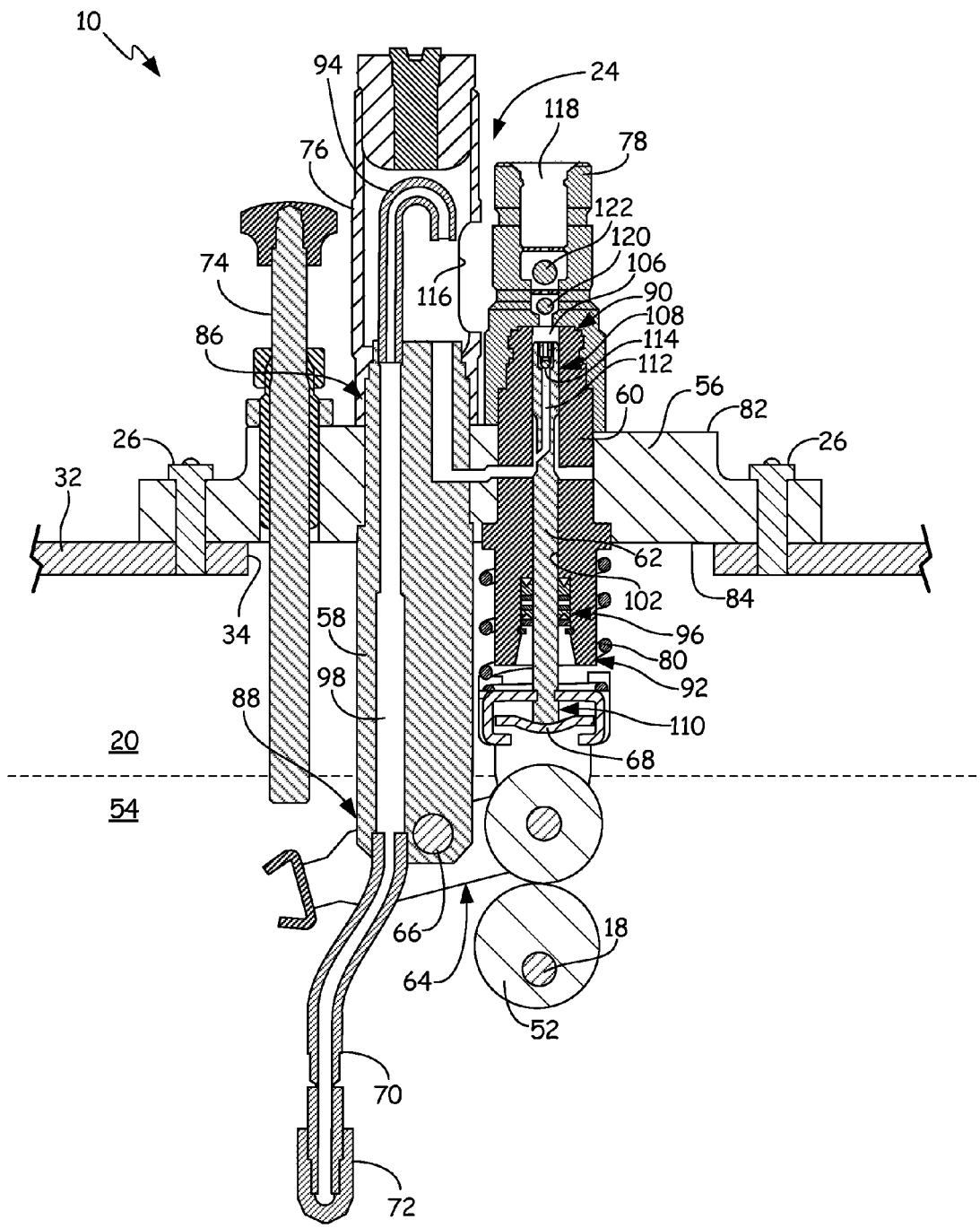
FIG. 4 is a cross sectional view of the pump of FIG. 3.

FIG. 4 is a cross-sectional view of fluid reservoir 20 and pump 24 taken along line 4-4 in FIG. 2. Box lubricator 10 includes camshaft 18, fluid reservoir 20, pump 24, and bolts 26. In the embodiment of FIG. 4, camshaft 18 includes cam 52. In the embodiment of FIG. 4, fluid reservoir 20 includes top plate 32, opening 34 and fluid 54. In the embodiment of FIG. 4, pump 24 includes main body 56, support post 58, piston housing 60, piston 62, rocker arm assembly 64, pivot joint 66, ball and socket joint 68, pump inlet tube 70, pump inlet strainer 72, adjustment screw 74, sight well 76, pump outlet assembly 78, spring 80, drip tube 94, and seal assembly 96. In the embodiment of FIG. 4, main body 56 includes first surface 82 and second surface 84. In the embodiment of FIG. 4, support post 58 includes support post first end 86, support post second end 88, pump inlet passage 98, and fluid pathway 100. In the embodiment of FIG. 4, piston housing 60 includes piston housing first end 90, piston housing second end 92, bore 102, piston housing inlet 104, and piston housing outlet 106. In the embodiment of FIG. 4, piston 62 includes piston first end 108, piston second end 110, fluid passage 112, and first check valve 114. In the embodiment of FIG. 4, sight well 76 includes window 116. In the embodiment of FIG. 4, pump outlet assembly 78 includes pump outlet passage 118, second check valve 120, and third check valve 122.

In FIG. 4, components of like numbering with the components of FIG. 3 are assembled as discussed above with reference to FIG. 3. Pump inlet passage 98 is formed inside support post 58 and extends through support post 58 from support post second end 88 to support post first end 86. Pump inlet tube 70 is connected to support post second end 88 and extends away from support post second end 88 further into fluid reservoir 20. Pump inlet strainer 72 is connected to pump inlet tube 70 opposite support post second end 88 and strains fluid 54 that enters pump 24. Fluid pathway 100 is also formed inside support post 58 and extends from support post first end 86 towards support post second end 88, exiting support post 58 between first surface 82 and second surface 84 of main body 56 of pump 24. Drip tube 94 is connected inside pump inlet passage 98 at support post first end 86 and extends away from support post first end 86 while curving back in a candy-cane fashion towards support post first end 86 and fluid pathway 100 without contacting fluid pathway 100. Sight well 76 is connected to support post first end 86 and covers support post first end 86 and drip tube 94. Sight well 76 includes window 116 which is transparent and permits visual inspection of fluid 54 traveling through support post 58 and drip tube 94 to piston housing 60. When fluid 54 enters pump 24, fluid 54 travels into pump inlet tube 70 through pump inlet strainer 72. Fluid 54 passes from pump inlet tube 70 into support post 58 through pump inlet passage 98. Fluid 54 then travels through pump inlet passage 98 and up into drip tube 94 where it will exit drip tube 94 and fall back into support post 58 through fluid pathway 100. Fluid pathway 100 directs fluid 54 towards piston housing 60.

Bore 102 is formed in piston housing 60 and extends from piston housing second end 92 through piston housing first end 90. Piston housing inlet 104 is formed in piston housing 60 between piston housing first end 90 and piston housing second end 92, and intersects bore 102. When piston housing 60 is attached to main body 56 of pump 24, piston housing inlet 104 is disposed on piston housing 60 between first surface 82 and second surface 84 of main body 56 adjacent to fluid pathway 100 of support post 58 and fluidly communicates with fluid pathway 100 through a passage within main body 56. In the embodiment of FIG. 4, fluid pathway 100 may extend into main body 56 between support post 58 and piston housing 60 to connect with piston housing inlet 104. Piston housing outlet 106 is disposed on piston housing first end 90 and may be integral with bore 102 at piston housing first end 90. Pump outlet assembly 78 is connected to piston housing first end 90. Pump outlet passage 118 extends through pump outlet assembly 78 and is next to and concentric with piston housing outlet 106. Second check valve 120 and third check valve 122 are disposed inside pump outlet passage 118 of pump outlet assembly 78.

Figure 7:
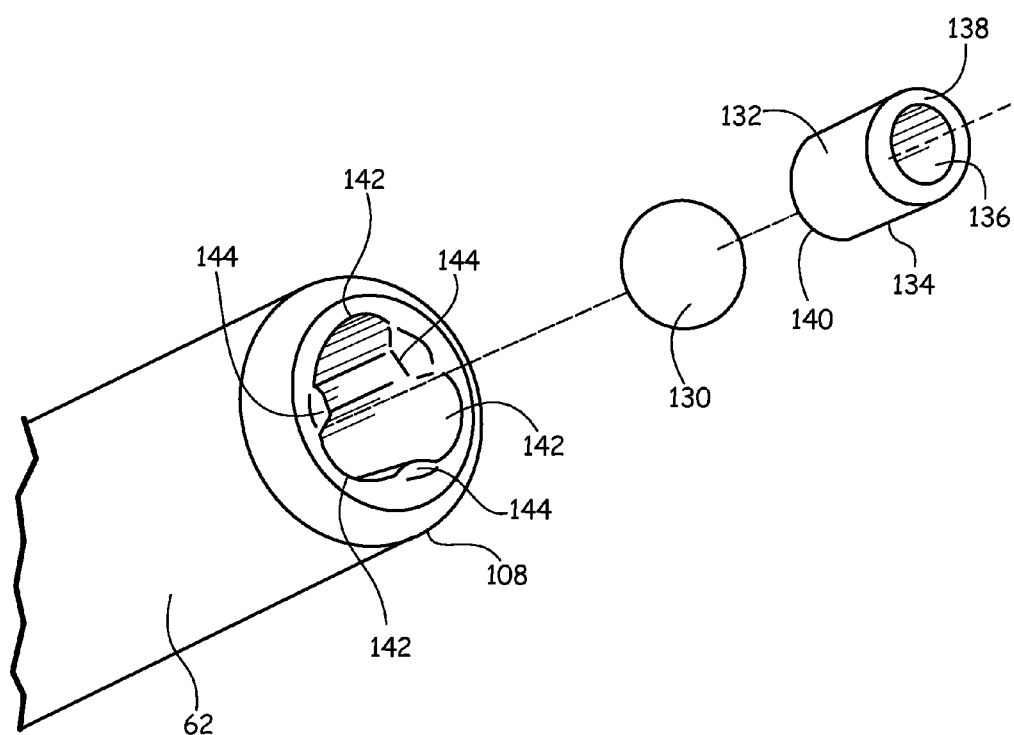
FIG. 7 is an exploded perspective view of the first end of the piston of FIG. 6.

Piston 62 is disposed inside bore 102 of piston housing 60 and extends in a generally cylindrical geometry from piston first end 108 to piston second end 110. Piston first end 108 is disposed inside bore 102 proximate piston housing first end 90 and piston second end 110 extends out of bore 102 through piston housing second end 92 into fluid reservoir 20. Fluid passage 112 is formed in piston 62 and extends from piston first end 108 towards piston second end 110, exiting piston 62 into bore 102 between first surface 82 and second surface 84 of main body 56 of pump 24. First check valve 114, which is discussed in greater detail below with reference to FIGS. 6 and 7, is formed inside piston first end 108 and is aligned with and fluidly communicates with fluid passage 112 inside piston 62. Seal assembly 96 is disposed inside piston housing 60 and around piston 62 between piston housing inlet 104 and piston housing second end 92. Seal assembly 96, which is discussed in greater detail below with reference to FIG. 8, fluidly seals piston housing 60 and piston 62 such that fluid 54 travels through pump 24 without leaking back into fluid reservoir 20 through piston 62 and piston housing 60.

When piston 62 in the embodiment of FIG. 4 actuates between an up and down stroke, fluid 54 in fluid reservoir 20 enters pump 24 through pump inlet strainer 72 and pump inlet tube 70. Fluid 54 passes from pump inlet tube 70 into support post 58 through pump inlet passage 98. Fluid 54 then travels through pump inlet passage 98 and up into drip tube 94 where it will exit drip tube 94 and fall back into support post 58 through fluid pathway 100. Fluid pathway 100 directs fluid 54 into piston housing 60 through piston housing inlet 104, and piston housing inlet 104 directs fluid 54 into bore 102. When piston 62 is in a down stroke position, check valve 114 opens and fluid 54 travels through fluid passage 112 inside piston 62 where it crosses first check valve 114 and exits piston 62, thereby being trapped between first check valve 114 and second check valve 120. When piston 62 moves to an up stroke position, first check valve 114 closes so that fluid 54 may not pass back into fluid passage 112. Fluid 54 then travels through piston housing outlet 106, into pump outlet passage 118 of pump outlet assembly 78 where fluid 54 opens and passes across second check valve 120 and third check valve 122. When piston 62 moves back to a down stroke position, second check valve 120 and third check valve 122 close, thereby preventing fluid 54 that has traveled outside of pump 24 from reentering pump 24 through pump outlet passage 112.

Adjustment screw 74 extends through first surface 82 and second surface 84 of main body 56, through opening 34 of top plate 32 of fluid reservoir 20, and into fluid reservoir 20. Adjustment screw 74 is in close proximity to support post 58 opposite piston housing 60. Pivot joint 66 connects rocker arm assembly 64 to support post second end 88. Rocker arm assembly 64 extends from pivot joint 66 and support post second end 88 towards piston housing 60 and extends between piston housing second end 92 and cam 52 of camshaft 18. Rocker arm assembly 64 also extends from pivot joint 66 and support post second end 88 towards adjustment screw 74. Pivot joint 66 permits rocker arm assembly 64 to rotate on support post second end 88. Ball and socket joint 68, which is discussed in greater detail below with reference to FIGS. 9 and 10, connects piston second end 110 to rocker arm assembly 64 between piston housing second end 92 and cam 52. Spring 80 is disposed around piston housing 60 and extends between second surface 84 of main body 56 and rocker arm assembly 64. When cam shaft 18 is rotated, cam 52 and spring 80 move piston 62 between a suction position and a discharge position. Adjustment screw 74 regulates the distance in which spring 80 may pull piston 62 down towards cam 52 by limiting the distance rocker arm assembly 64 may rotate on support post second end 88. Regulating the distance in which spring 80 may pull piston 62 down towards cam 52 regulates the maximum displacement of piston 62 inside piston housing 60 and amount of fluid 54 piston 62 pulls into pump 24 per unit measure of time.

Fluid 54 inside fluid reservoir 20 is typically maintained at a level sufficient to submerge pump inlet strainer 72, most of pump inlet tube 70, camshaft 18, cam 52, and rocker arm assembly 64. As described above, the embodiment of pump 24 in FIG. 4 pumps fluid 54 out fluid reservoir 20. As pump 24 pumps fluid 54 out of fluid reservoir 20, pump 24 self lubricates piston 62 with fluid 54. Because pump 24 as embodied in FIG. 4 pumps fluid 54 out of fluid reservoir 20, pump 24 is a suction fed pump. Pump 24 may also be configured to be a gravity fed pump or a pressure fed pump. In a gravity fed configuration or a pressure fed configuration, pump 24 would pump a fluid other than fluid 54 in fluid reservoir 20. This different fluid would be gravity delivered or pressure delivered to pump 24 from some other reservoir and not fluid reservoir 20. This different fluid would be fed directly into fluid pathway 100 at support post first end 86. Because this different fluid would be fed directly into fluid pathway 100 at support post first end 86, pump 24 in a gravity fed configuration or a pressure fed configuration will not include pump inlet strainer 72, pump inlet tube 70, and pump inlet passage 98, and may not include drip tube 94. Seal assembly 96 fluidly seals piston housing 60 and piston 62 such that this different fluid from some other reservoir travels through pump 24 without leaking into fluid reservoir 20 through piston 62 and piston housing 60 and mixing with fluid 54. Thus, camshaft 18, cam 52, and rocker arm assembly 64 of pump 24 are able to lubricate in fluid 54 inside fluid reservoir 20 while pump 24, in a gravity fed or pressure fed configuration, pumps a fluid different from fluid 54 without the two fluids mixing and contaminating one another.

Figure 5:
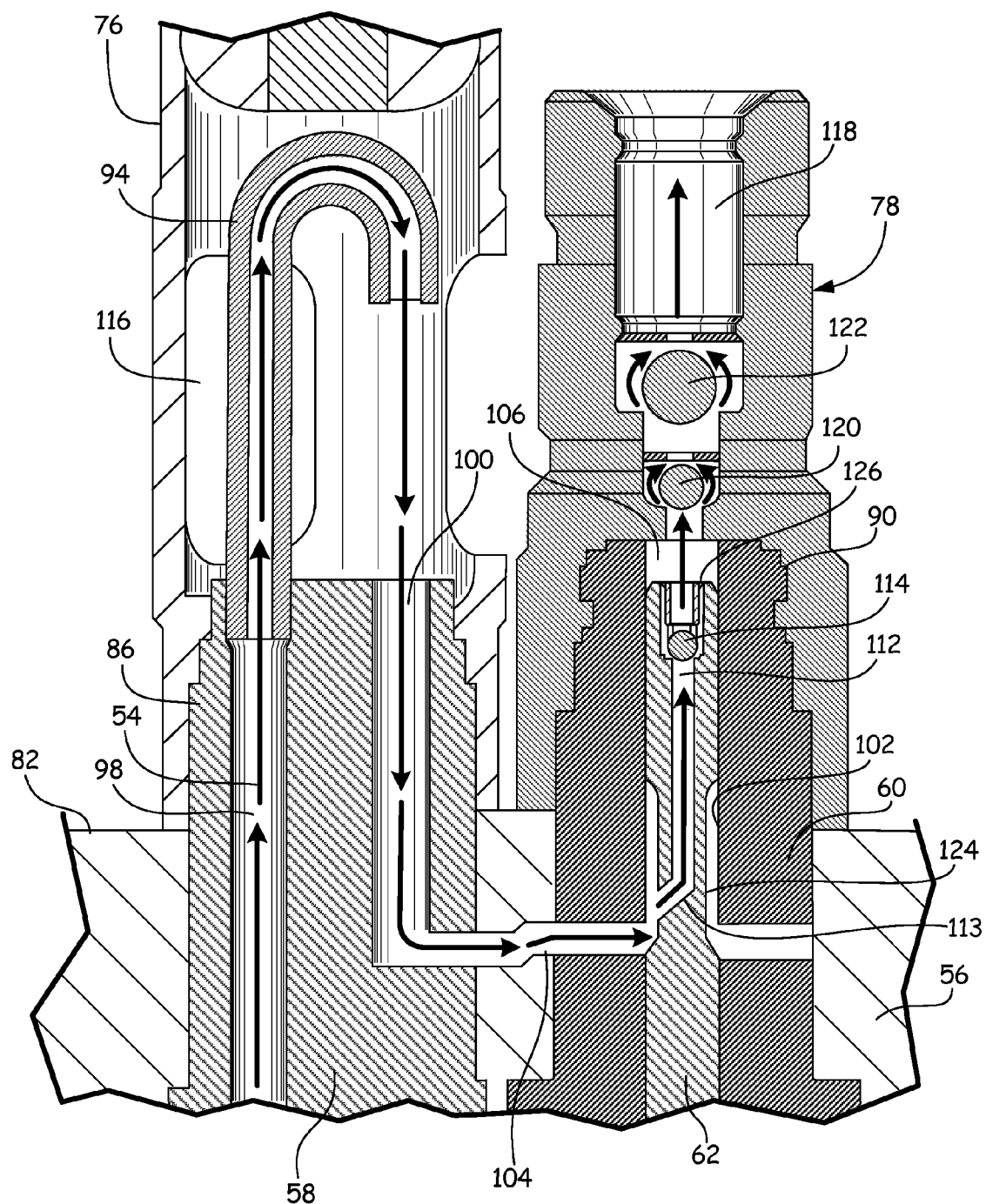
FIG. 5 is an enlarged cross sectional view of a piston of the pump of FIG. 4.

FIG. 5 is an enlarged cross sectional view of pump 24 of FIG. 4 at support post first end 86 and piston housing first end 90. Pump 24 pumps fluid 54 and includes main body 56, support post 58, piston housing 60, piston 62, sight well 76, pump outlet assembly 78, and drip tube 94. In the embodiment of FIG. 5, main body 56 includes first surface 82 and second surface 84 (shown in FIG. 4). In the embodiment of FIG. 5, support post 58 includes support post first end 86, support post second end 88 (shown in FIG. 4), pump inlet passage 98, and fluid pathway 100. In the embodiment of FIG. 5, piston housing 60 includes piston housing first end 90, piston housing second end 92 (shown in FIG. 4), bore 102, piston housing inlet 104, and piston housing outlet 106.

In the embodiment of FIG. 5, piston 62 includes piston first end 108, piston second end 110 (shown in FIG. 4), fluid passage 112, fluid passage inlet 113, first check valve 114, reduced diameter portion 124, and first recess 126. In the embodiment of FIG. 5, sight well 76 includes window 116. In the embodiment of FIG. 5, pump outlet assembly 78 includes pump outlet passage 118, second check valve 120, and third check valve 122.

Components of like numbering as the components disclosed in FIG. 4 are assembled as discussed above with reference to FIG. 4. In the embodiment of FIG. 5, piston 62 is in a down stroke position. First recess 126 is formed in piston first end 108 and has a diameter larger than a diameter of fluid passage 112 yet smaller than a diameter of piston 62. First recess 126 fluidly communicates with fluid passage 112 and piston housing outlet 106. First check valve 114 is disposed inside first recess 126 and permits fluid 54 to flow out of piston first end 108 into piston housing outlet 106 while preventing fluid 54 from reentering fluid passage 112 through piston first end 108. Reduced diameter portion 124 is formed on piston 62 between piston first end 108 and piston second end 110, and intersects fluid passage 112 at fluid passage inlet 113. As piston 62 moves from a down stroke position to an upstroke position and back again, reduced diameter portion 124 ensures that fluid passage 112 remains fluidly connected at all times to piston housing inlet 104 by providing a constant fluid path between piston housing inlet 104 and fluid passage inlet 113 inside piston 62. When piston 62 strokes downward, piston 62 creates a vacuum inside piston housing outlet 106. The vacuum created by piston 62 in the down stroke position opens first check valve 114 inside piston first end 108 and pulls fluid 54 into pump inlet passage 98 inside support post 58, then across drip tube 94, then across fluid pathway 100 inside support post 58 and main body 56. The vacuum the pulls fluid 54 across piston housing inlet 104, then between bore 102 and reduced diameter portion 124 of piston 62, then into fluid passage inlet 113 and across fluid passage 112, then across first check valve 114 where fluid 54 exits piston 62 and accumulates inside piston housing outlet 106. Once fluid 54 has finished accumulating inside piston housing outlet 106, first check valve 114 closes and piston 62 begins to stroke upward. As piston 62 strokes upward, piston first end 108 pushes accumulated fluid 54 out of piston housing outlet 106, into pump outlet passage 118 of pump outlet assembly 78. The force of fluid 54 entering pump outlet passage 118 opens second check valve 120 and third check valve 122 such that fluid 54 travels across second check valve 120 and third check valve 122 where it exits pump 24. As piston 62 strokes downward again, the vacuum created by downward stroking piston 62 closes second check valve 120 and third check valve 122 such that fluid 54 that has exited pump 24 will not be pulled back into pump 24.

FIGS. 6A-7 will now be discussed concurrently. FIG. 6A is an enlarged cross sectional view of piston first end 108 from the embodiment of FIG. 5, showing first check valve 114 in a closed position. FIG. 6B is another enlarged cross sectional view of piston first end 108 from the embodiment of FIG. 5 showing first check valve 114 in an open position. FIG. 7 is an exploded perspective view of piston first end 108 from the embodiment of FIGS. 6A and 6B. Piston 62 includes piston first end 108, piston second end 110 (shown in FIG. 4), fluid passage 112, first check valve 114, first recess 126, and chamfered surface 128. In the embodiments of FIGS. 6A-7, first check valve 114 includes check ball 130 and retaining guide 132. Retaining guide 132 includes outer cylindrical surface 134, inner cylindrical surface 136, retaining guide first end 138 and retaining guide second end 140. In the embodiments of FIGS. 6A-7, first recess 126 includes channels 142 and ribs 144. Piston 62 pumps fluid 54.

First recess 126 is formed in piston first end 108 and has a diameter larger than a diameter of fluid passage 112 yet smaller than a diameter of piston 62. First recess 126 is next to fluid passage 112 and is fluidly connected to fluid passage 112. Ribs 144 are formed inside first recess 126 and extend substantially the entire depth of first recess 126 into piston first end 108. Channels 142 are disposed between ribs 144, which circumferentially space apart channels 142 inside first recess 126. Each channel 142 is disposed between two ribs 144. In the embodiment of FIGS. 6A and 6B, three channels 142 and two ribs 144 are visible. Check ball 130 is disposed inside first recess 126 and has a diameter larger than a diameter of fluid passage 112 yet small enough to allow check ball 130 to move up and down inside first recess 126 along ribs 144 without check ball 130 binding against ribs 144. Chamfered surface 128 may be disposed between fluid passage 112 and first recess 126 and may provide a seat for check ball 130 and aid check ball 130 in closing off fluid passage 112 when first check valve 114 is in a closed position.

Retaining guide 132 is shaped as an annular cylindrical pipe, with outer cylindrical surface 134 on the outside, inner cylindrical surface 136 on the inside, and two opposing ends defined by retaining guide first end 138 and retaining guide second end 140. When retaining guide 132 is inserted into first recess 126, outer cylindrical surface 134 of retaining guide 132 abuts against ribs 144 in a press fit, with retaining guide first end 138 disposed at piston first end 108 and retaining guide second end 140 extending into first recess 126 towards check ball 130. Inner cylindrical surface 136 of retaining guide 132 is smaller in diameter than check ball 130 such that check ball 130 may not pass through retaining guide 132. First recess 126 accommodates both check ball 130 and retaining guide 132 because the depth first recess 126 extends into piston 62 is equal to or deeper than the length of retaining guide 132 combined with the diameter of check ball 130. Once installed, retaining guide 132 leaves enough space within first recess 126 that check ball 130 may move inside first recess 126 between open and closed positions. As discussed above in the description of FIG. 5, first check valve 114 closes as piston 62 strokes upward and first check valve 114 opens as piston 62 strokes downward. In the closed position, check ball 130 rests against chamfered surface 128 and blocks fluid passage 112 such that fluid 54 that has already crossed first check valve 114 may not reenter fluid passage 112. In the open position, check ball 130 is raised above chamfered surface 128 and fluid passage 112 such that fluid 54 enters first recess 126, flows into channels 142, flows past retaining guide 132 through channels 142, and exits piston first end 108. While the retaining guide 132 is described as an annular cylindrical pipe press-fitted inside first recess 126, it will be understood by those skilled in the art that retaining guide 132 may be threaded or snap fitted into first recess 126, or that retaining guide 132 may include a geometry that is different from an annular cylindrical pipe yet still capable of allowing fluid 54 to exit first recess 126 while retaining check ball 130 within first recess 126. Because retaining guide 132 is generally formed as a single component, retaining guide 132 provides an effective, inexpensive, and simple solution for retaining check ball 130 inside recess 126.

Figure 8:
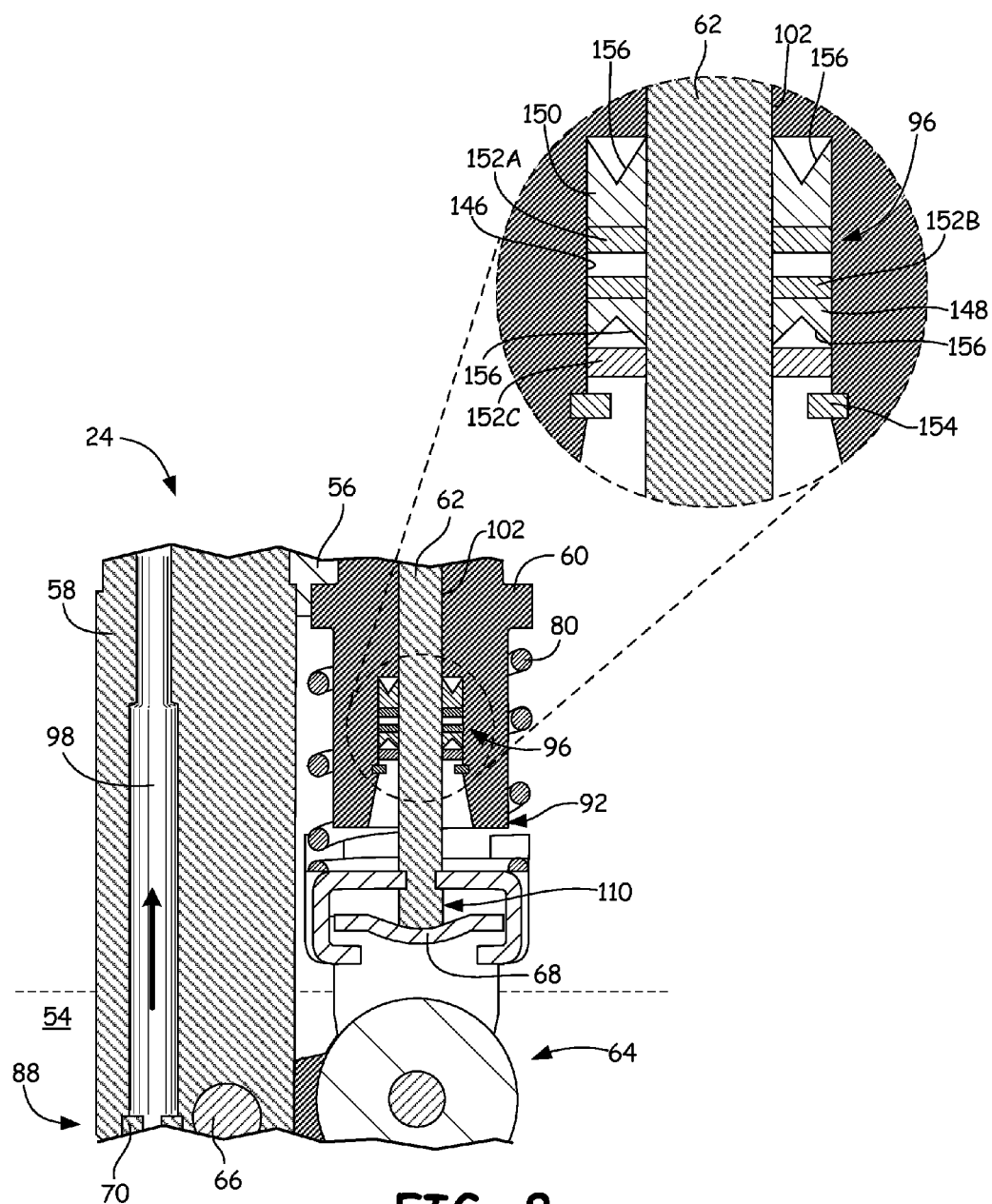
FIG. 8 is an enlarged cross sectional view of a piston seal assembly of the pump of FIG. 4.

FIG. 8 is an enlarged cross sectional view of piston seal assembly 96 from the embodiment of pump 24 described in FIG. 4. Pump 24 includes main body 56, support post 58, piston housing 60, piston 62, rocker arm assembly 64, pivot joint 66, ball and socket joint 68, pump inlet tube 70, spring 80, and seal assembly 96. In the embodiment of FIG. 8, support post 58 includes support post first end 86 (shown in FIG. 4), support post second end 88, and pump inlet passage 98. In the embodiment of FIG. 8, piston housing 60 includes piston housing first end 90 (shown in FIG. 4), piston housing second end 92, piston housing inlet 104 (shown in FIG. 4), and bore 102. Piston housing 60 further includes second recess 146. In the embodiment of FIG. 8, piston 62 includes piston first end 108 (shown in FIG. 4), and piston second end 110. In the embodiment of FIG. 8, seal assembly 96 includes first elastomeric seal 148, second elastomeric seal 150, spacer 152A, spacer 152B, spacer 152C and snap ring 154. First elastomeric seal 148 and second elastomeric seal may be U-cup seals that include fringes 156. Pump 24 is lubricated by fluid 54 and may pump fluid 54.

In FIG. 8, components of like numbering with the components of FIG. 4 are assembled as discussed above with reference to FIG. 4. Second recess 146 is formed in piston housing 60 at piston housing second end 92 and extends from piston housing second end 92 towards piston housing inlet 104 without reaching piston housing inlet 104. Second recess 146 has a diameter larger than a diameter of bore 102 so as to accommodate seal assembly 96 and second recess 146 is approximately concentric with bore 102 and piston 62. First elastomeric seal 148 and second elastomeric seal 150 are each disposed around piston 62 inside second recess 146. In the embodiment of FIG. 8, both first elastomeric seal 148 and second elastomeric seal 150 are U-cup seals. First elastomeric seal 148 is oriented inside second recess 146 and around piston 62 such that its U-cup geometry and fringes 156 face towards piston housing first end 90. Second elastomeric seal 150 is oriented inside second recess 146 and around piston 62 such that its U-cup geometry and fringes 156 face towards piston housing second end 92. As piston 62 actuates inside pump 24 and pumps fluid 54, pressure builds-up inside pump 24 and pushes fringes 156 of first elastomeric seal 148 and second elastomeric seal 150 against piston 62 and the walls of second recess 146 thereby creating a tight seal that prevents fluid 54 from leaking out of pump 24 along piston 62 and second recess 146 at piston housing second end 92. Spacer 152A and spacer 152B are disposed inside second recess 146 between first elastomeric seal 148 and second elastomeric seal 150. Along with spacing first elastomeric seal 148 from second elastomeric seal 150, spacer 152A and spacer 152B provide backing and support to first elastomeric seal 148 and second elastomeric seal 150 to ensure first elastomeric seal 148 and second elastomeric seal 150 engage piston 62 and second recess 146 evenly. Snap ring 154 is disposed inside second recess 146 between piston housing second end 92 and first elastomeric seal 148 and second elastomeric seal 150. Spacer 152C is disposed between snap ring 154 and first elastomeric seal 148 and second elastomeric seal 150. Spacer 152C prevents pinching of first elastomeric seal 148 by snap ring 154 and ensures that first elastomeric seal 148 engages piston 62 and second recess 146 evenly. Snap ring 154 retains first elastomeric seal 148, second elastomeric seal 150, space 152A, spacer 152B, and spacer 152C inside second recess 146. Because of snap ring 154 and spacers 152A, 152B, and 152C, seal assembly 96 is easily installed inside second 146 and is easy to replace.

As discussed above in the description of FIG. 4, seal assembly 96 fluidly seals piston housing 60 and piston 62 such that pump 24 can pump fluid 54 without fluid 54 leaking out of pump 24 between piston housing 60 and piston 62. Seal assembly 96 is especially useful when pump 24 is configured as a gravity fed pump or a pressure fed pump. When pump 24 is a gravity fed pump or a pressure fed pump, pump 24 pumps a fluid other than fluid 54. This different fluid is pressure fed or gravity fed directly into fluid pathway 100 of pump 24 from a reservoir different from fluid reservoir 20 which houses fluid 54 and to which pump 24 is mounted. After this different fluid is fed into fluid pathway 100 of pump 24, pump 24 pumps it away from pump 24. While pump 24 is pumping this different fluid, fluid 54 lubricates rocker arm assembly 64, pivot joint 66, and ball and socket joint 68. As pump 24 pumps this different fluid and fluid 54 lubricates rocker arm assembly 64, pivot joint 66, and ball and socket joint 68, seal assembly 96 ensures that the different fluid inside pump 24 does not leak into and contaminate fluid 54. Preventing the contamination of fluid 54 by the different fluid in pump 24 ensures the quality of fluid 54 which is selected to optimize the performance of pump 24. Meanwhile, pump 24 is able to deliver a different fluid that meets the requirements of the end to which it is delivered though pump 24 is lubricated by fluid 54 which is selected to optimize the performance of pump 24.

Figure 9:
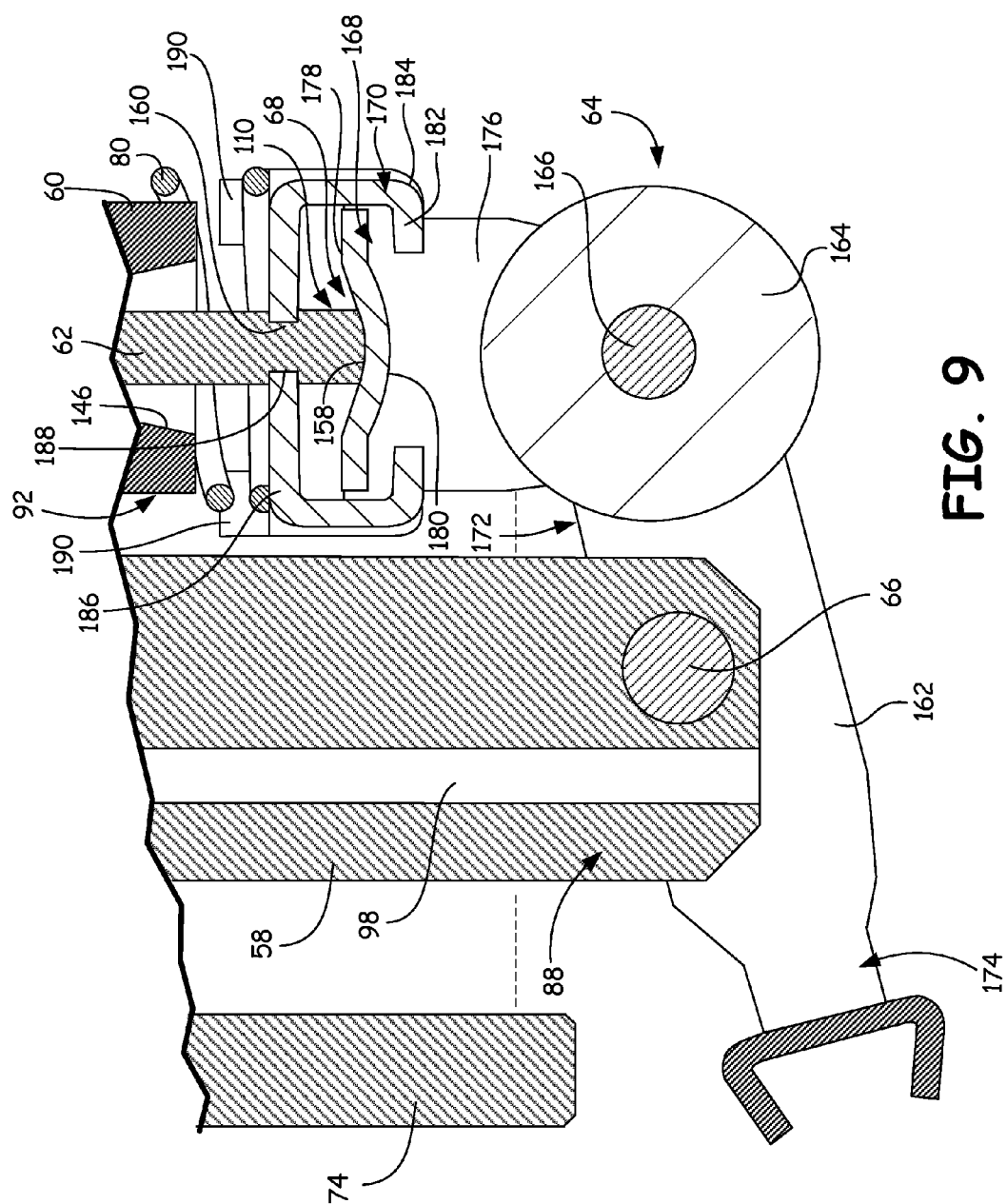
FIG. 9 is an enlarged cross sectional view of a ball and socket joint connecting a rocker assembly to a second end of a piston of the pump of FIG. 4.
Figure 10:
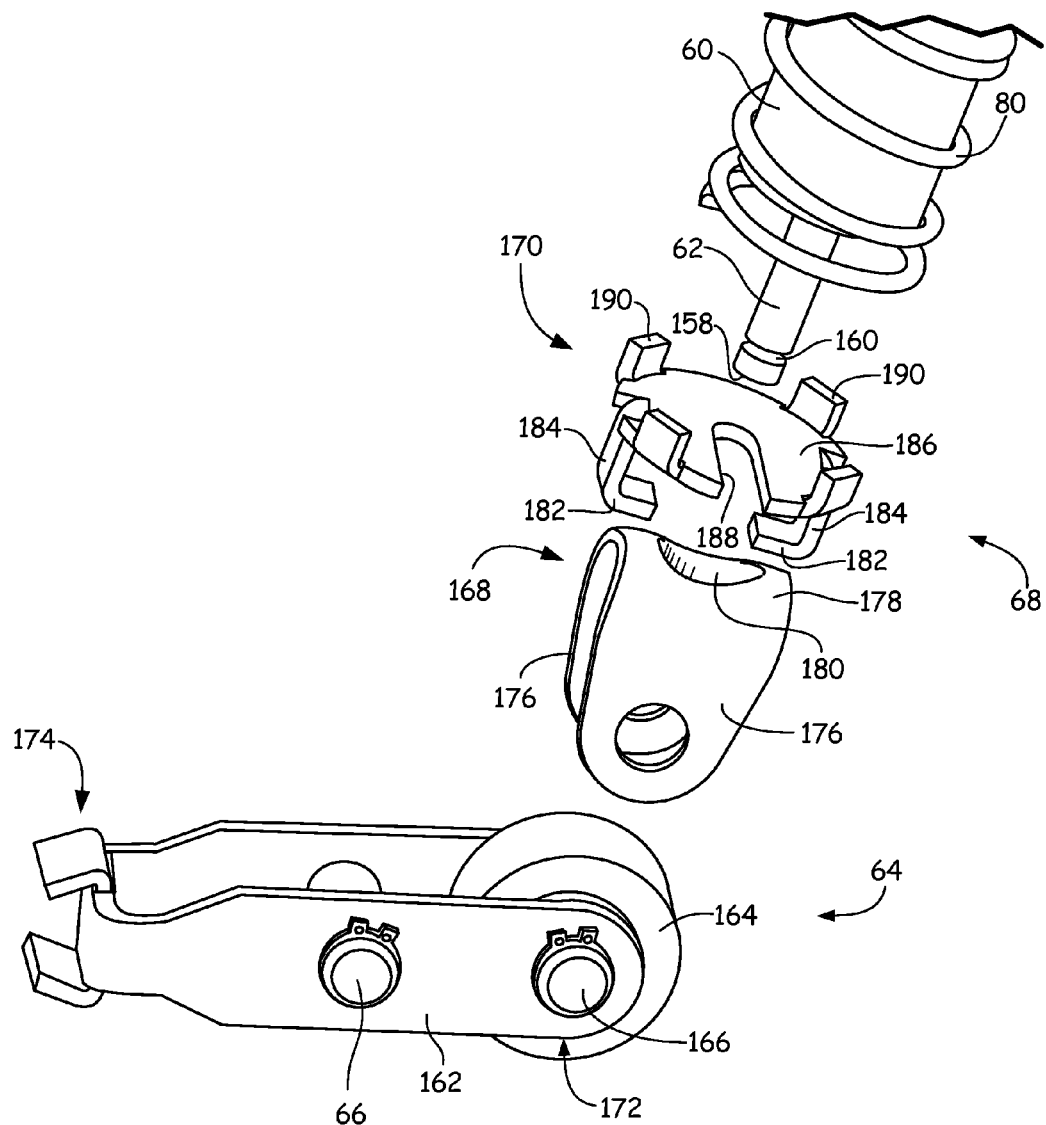
FIG. 10 is a partial exploded view of the ball and socket joint of FIG. 9.

FIGS. 9 and 10 will now be discussed concurrently. FIG. 9 is an enlarged cross sectional view of ball and socket joint 68 connecting rocker assembly 64 to piston second end 110 of piston 62 of pump 24 shown in FIG. 4. FIG. 10 is a partial exploded view of the embodiment of FIG. 9. Pump 24 includes main body 56 with second surface 84, support post 58, piston housing 60, piston 62, rocker arm assembly 64, pivot joint 66, ball and socket joint 68, adjustment screw 74, and spring 80. In the embodiment of FIG. 9, support post 58 includes support post second end 88, and pump inlet passage 98. In the embodiment of FIG. 9, piston housing 60 includes piston housing second end 92, bore 102 (shown in FIG. 4), and second recess 146. In the embodiment of FIG. 9, piston 62 includes piston second end 110, rounded surface 158, and annular groove 160. In the embodiment of FIG. 9, rocker arm assembly 64 includes arm 162, roller 164, roller joint 166, seat 168, and coupler 170. Arm 162 includes arm first end 172 and arm second end 174. Seat 168 includes side plates 176 and top plate 178; top plate 178 including dimple 180. Coupler 170 includes prongs 182, sides 184, platform 186, slot 188, and spring guards 190.

In FIGS. 9 and 10, components of like numbering with the components of FIGS. 4 and 8 are assembled as discussed above with reference to FIGS. 4 and 8. Rounded surface 158 of piston 62 is formed on piston second end 110, and annular groove 160 is formed on piston 62 between piston first end 108 and piston second end 110 on a portion of piston 62 that extends outside of piston housing second end 92 after piston 62 is installed inside piston housing 60. Pivot joint 66 connects arm 162 of rocker arm assembly 64 to support post second end 88 and allows arm 162 to rotate. Arm first end 172 extends from pivot joint 66 towards piston 62 while arm second end 174 extends from pivot joint 66 towards adjustment screw 74. Roller joint 166 connects roller 164 to arm first end 172 and allows roller 164 to spin on arm first end 172. Seat 168 has two side plates 176 that extend from top plate 178 of seat 168 to form a U-shaped yoke that connects to roller joint 166 such that roller 164 is disposed between the two side plates 176 and beneath the top plate of seat 168. Because seat 168 is connected to roller joint 166, seat 168 is also connected to arm first end 172. In the embodiment of FIG. 9, only one of the two side plates 176 is shown because FIG. 9 is a cross sectional view. Dimple 180 is centered on top plate 178 of seat 168 and mates with rounded surface 158 of piston 62. Together, rounded surface 158 of piston 62 and dimple 180 of seat 168 form ball and socket joint 68.

Coupler 170 connects top plate 178 of seat 168 to piston 62 and maintains the joint between rounded surface 158 of piston 62 and dimple 180 of seat 168. Slot 188 is formed in platform 186 of coupler 170 and mates with annular groove 160 of piston 62 such that platform 186 extends into annular groove 160 of piston 62, connecting coupler 170 to piston 62. Coupler 170 is a C-clip with sides 184 extending down from platform 186 away from piston 62 and past top plate 178 of seat 168. Prongs 182 extend perpendicularly from sides 184 between top plate 178 and arm first end 172, thereby connecting coupler 170 to seat 168. Spring 80 is disposed around piston housing 60 and extends between second surface 84 of main body 56 and platform 186 of coupler 170. Spring guards 190 extend from platform 186 toward piston housing first end 90 and prevent spring 80 from slipping off of platform 186.

As described above, pump 24 is actuated by camshaft 18 with a cam 52 as shown in FIG. 4. Cam 52 of camshaft 18 rotates against roller 164, causing roller 164 to essentially travel over an arc. As cam 52 rotates against roller 164, cam 52 periodically pushes roller 164, arm first end 172, seat 168, piston 62, and coupler 170 towards piston housing first end 90, compressing spring 80 in the process. Between the periods where cam 52 is pushing roller 164, arm first end 172, seat 168, piston 62, and coupler 170 towards piston housing first end 90, spring 80 decompresses and pushes coupler 170, piston 62, seat 168, arm first end 172, and roller 164 away from piston housing first end 90 and towards cam 52. As cam 52 and spring 80 move roller 164, arm first end 172, seat 168, piston 62, and coupler 170 back and forth, ball and socket joint 68 and coupler 170 ensure that piston 62 remains aligned with bore 102 of piston housing 60 by preventing piston second end 110 from shifting laterally on seat 168.

In a prior art pump, the piston has a flat second end which has a tendency to slip laterally against the rocker arm assembly actuating it. This slipping action in the prior art pump places a bending moment on the second end of the piston which increases the wear between the piston and the piston housing, thereby reducing the tolerances between the piston and the piston housing, and reducing the life of the pump. Because ball and socket joint 68 and coupler 170 prevents piston second end 110 from slipping, piston 62 and piston housing 60 are able to maintain tolerances as tight as 0.00045 inches to 0.00025 inches. Such tight tolerances increase the efficiency of pump 24 by reducing fluid leakage between piston 62 and piston housing 60.

Figure 11:
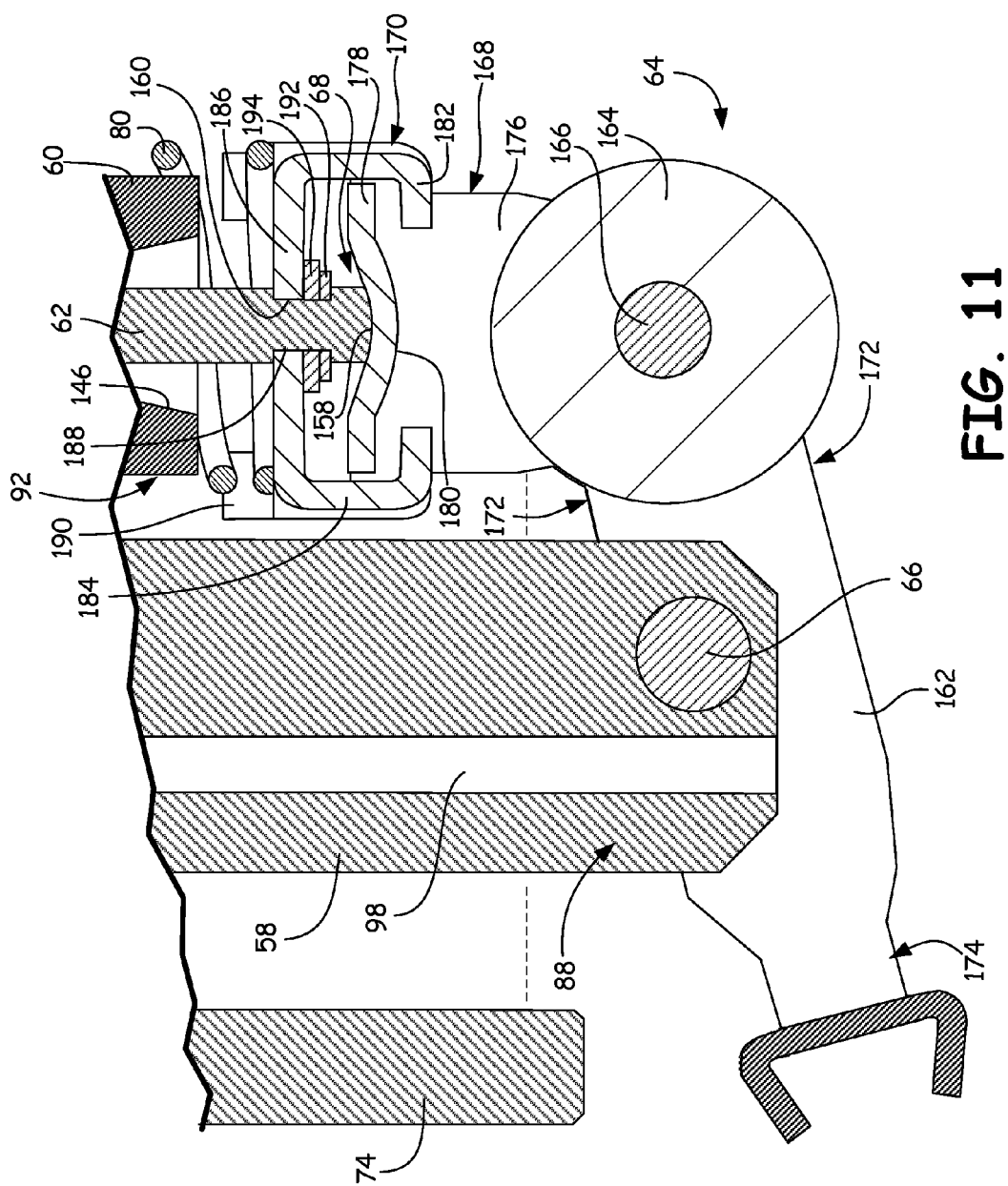
FIG. 11 is an enlarged cross sectional view of another embodiment of a ball and socket joint connecting a rocker assembly to a second end of a piston of a pump.

FIG. 11 is an enlarged cross sectional view of another embodiment of ball and socket joint 68 connecting rocker assembly 64 to piston second end 110 of piston 62 of pump 24. In FIG. 11, components of like numbering with the components of FIGS. 4, 9, and 10 are assembled as discussed above with reference to FIGS. 4, 9, and 10. In the embodiment of FIG. 11, coupler 170 further includes clip 192, and washer 194.

As discussed above, coupler 170 connects top plate 178 of seat 168 to piston 62 and maintains the joint between rounded surface 158 of piston 62 and dimple 180 of seat 168. Slot 188 is formed in platform 186 of coupler 170 and mates with annular groove 160 of piston 62 such that platform 186 extends into annular groove 160 of piston 62. Washer 194 and clip 192 are disposed around piston 62 inside annular groove 160 and between platform 186 and seat 168. Washer 194 and clip 192 assist in connecting piston 62 to coupler 170 by preventing platform 186 of coupler 170 from slipping out of annular groove 160 of piston 62.

In view of the foregoing description, it will be recognized that the present disclosure provides numerous advantages and benefits. For example, the present disclosure allows box lubricator 10 to pump a fluid different from fluid 54 used to lubricate pump 24 of box lubricator 10. Moreover, the present disclosure maintains tolerances as tight as 0.00045 inches to 0.00025 inches between piston 62 and piston housing 60 by reducing the lateral movement of piston second end 110. Additionally, the present disclosure provides an effective, inexpensive, and simple retaining guide 132 for retaining check ball 130 inside recess 126 formed in piston first end 108.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

The invention claimed is:

1. A pump comprising:
   a support post comprising a post first end opposite a post second end;
   a piston housing extending from a housing first end to a housing second end, the piston housing including a bore extending through the piston housing from the housing first end to the housing second end;
   a piston disposed inside the bore of the piston housing and comprising a piston first end opposite a piston second end, wherein the piston second end comprises a rounded surface;
   a main body joining the support post and the piston housing; and
   a rocker arm assembly extending from the post second end to the piston second end, wherein the rocker arm assembly is pivotally connected to the post second end and connected to the piston second end by a ball and socket joint, wherein the rocker arm assembly comprises:
      an arm with an arm first end extending away from the post second end and toward the piston second end;
      a seat connected to the arm first end and comprising a top plate and a dimple formed in the top plate, wherein the dimple mates with the rounded surface of the piston second end, and wherein a cross-section of the seat is U-shape;
      a coupler connected to the piston second end and connected to the seat, thereby joining the rounded surface of the piston second end and the dimple of the seat to form the ball and socket joint between the piston second end and the rocker arm assembly arm, wherein the coupler comprises:
         a platform positioned between the housing second end and the top plate of the seat, wherein the platform is connected to the piston between the piston first end and the piston second end;
         a first side and a second side both extending from the platform toward the arm first end and past the top plate of the seat;

a first prong connected to the first side and extending between the arm first end and the top plate of the seat; and a second prong connected to the second side and extending between the arm first end and the top plate of the seat; and a spring is disposed around the piston housing between the main body and the coupler of the rocker arm assembly, wherein the spring is seated on the platform of the coupler.

2. The pump of claim 1, wherein the rocker arm assembly further comprises;

a roller; and a roller joint connecting the roller and the seat to the arm first end.

3. The pump of claim 1, further comprising;

a piston housing inlet intersecting the bore between the housing first end and the housing second end;

a fluid pathway fluidly connecting the piston housing inlet with the post first end;

a pump inlet passage formed inside the support post and extending through the support post;

a drip tube connected to the post first end and to the pump inlet passage; and wherein the drip tube fluidly connects the pump inlet passage to the fluid pathway in the main body.

4. A pump comprising:

a support post comprising a post first end opposite a post second end;

a piston housing extending from a housing first end to a housing second end, the piston housing including a bore extending through the piston housing from the housing first end to the housing second end;

a piston disposed inside the bore of the piston housing and comprising a piston first end opposite a piston second end, wherein the piston second end comprises a rounded surface;

a main body joining the support post and the piston housing; and a rocker arm assembly extending from the post second end to the piston second end, wherein the rocker arm assembly is pivotally connected to the post second end and connected to the piston second end by a ball and socket joint, wherein the rocker arm assembly comprises:

an arm with an arm first end extending away from the post second end and toward the piston second end;

a seat connected to the arm first end and comprising a top plate and a dimple formed in the top plate, wherein the dimple mates with the rounded surface of the piston second end;

a coupler connected to the piston second end and connected to the seat, thereby joining the rounded surface of the piston second end and the dimple of the seat to form the ball and socket joint between the piston second end and the rocker arm assembly arm, wherein the coupler comprises:

a platform positioned between the housing second end and the top plate of the seat, wherein the platform is connected to the piston between the piston first end and the piston second end;

a first side and a second side both extending from the platform toward the arm first end and past the top plate of the seat;

a first prong connected to the first side and extending between the arm first end and the top plate of the seat;

a second prong connected to the second side and extending between the arm first end and the top plate of the seat; and a plurality of spring guards extending from the platform toward the piston housing; and a spring is disposed around the piston housing between the main body and the coupler of the rocker arm assembly, wherein the spring is seated on the platform of the coupler.

* * * * *